(12) United States Patent
Lewis et al.

(10) Patent No.: US 7,103,533 B2
(45) Date of Patent: Sep. 5, 2006

(54) METHOD FOR PRESERVING CONTEXTUAL ACCURACY IN AN EXTENDIBLE SPEECH RECOGNITION LANGUAGE MODEL

(75) Inventors: James R. Lewis, Delray Beach, FL (US); Kerry A. Ortega, Raleigh, NC (US); C. Thomas Rutherfoord, Delray Beach, FL (US); Maria E. Smith, Plantation, FL (US)

(73) Assignee: International Business Machines Corporation, Armonk, NY (US)

( * ) Notice: Subject to any disclaimer, the term of this patent is extended or adjusted under 35 U.S.C. 154(b) by 1051 days.

(21) Appl. No.: 09/790,352

(22) Filed: Feb. 21, 2001

(65) Prior Publication Data

US 2002/0116194 A1 Aug. 22, 2002

(51) Int. Cl.
G06F 17/27 (2006.01)

(52) U.S. Cl. .......................... 704/9; 704/231; 704/251; 704/257

(58) Field of Classification Search ................ 704/240, 704/243, 244, 245, 255, 1, 9, 10, 257, 231, 704/251
See application file for complete search history.

(56) References Cited

U.S. PATENT DOCUMENTS

| | | | |
|---|---|---|---|
| 5,027,406 A * | 6/1991 | Roberts et al. | 704/244 |
| 5,680,511 A * | 10/1997 | Baker et al. | 704/257 |
| 5,835,893 A * | 11/1998 | Ushioda | 704/257 |
| 5,970,460 A * | 10/1999 | Bunce et al. | 704/278 |
| 6,188,976 B1 * | 2/2001 | Ramaswamy et al. | 704/9 |
| 6,314,399 B1 * | 11/2001 | Deligne et al. | 704/257 |
| 6,501,833 B1 * | 12/2002 | Phillips et al. | 379/88.07 |
| 6,532,444 B1 * | 3/2003 | Weber | 704/257 |
| 6,606,597 B1 * | 8/2003 | Ringger et al. | 704/270 |
| 6,691,088 B1 * | 2/2004 | Blasig | 704/240 |
| 6,697,769 B1 * | 2/2004 | Goodman et al. | 703/2 |
| 6,801,893 B1 * | 10/2004 | Backfried et al. | 704/257 |

OTHER PUBLICATIONS

Brown et al. 1992, Class-Based n-gram Models of Natural Language, Association for Computational Linguistics, pp. 467-479.*
Iyer et al. 1997, Using Out-of-Domain Data to Improve In-Domain Language Models, IEEE, pp. 221-223.*
Ringger et al., 1998 (Rapid language Model Develop for New Task Domains), University of Rochester, pp. 1-6.*

* cited by examiner

*Primary Examiner*—Richemond Dorvil
*Assistant Examiner*—Lamont Spooner
(74) *Attorney, Agent, or Firm*—Akerman-Senterfitt

(57) ABSTRACT

A method of generating language model statistics for a new word added to a language model incorporating at least one class file containing contextually related words. The method can include the following steps: First, language model statistics can be computed based on references to at least one incorporated class file. Second, a new word can be substituted for each reference to a selected class file. Additionally, the language model statistics can be re-computed based on the new word having been substituted for the reference. Third, the re-computed language model statistics can be displayed in a user interface and modifications can be accepted to the re-computed language model statistics through the user interface. Fourth, the language model statistics can be further re-computed based on the modifications. In consequence, the language model statistics are re-computed for the new word without introducing contextual inaccuracies in the language model.

20 Claims, 8 Drawing Sheets

[airport.cls]

O'Hare, high
Heathrow, low
LaGuardia, high
Kennedy, high
Dallas, medium
Atlanta, medium

FIG. 6

METHOD FOR PRESERVING CONTEXTUAL ACCURACY IN AN EXTENDIBLE SPEECH RECOGNITION LANGUAGE MODEL

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

The present invention relates to the field of speech recognition software and more particularly to a method of augmenting a language model for a speech recognition vocabulary.

2. Description of the Related Art

Speech recognition is the process by which acoustic signals, received via a microphone, are "recognized" and converted into words by a computer. These recognized words may then be used in a variety of computer software applications. For example, speech recognition may be used to input data, prepare documents and control the operation of software applications. Speech recognition systems programmed or trained to the diction and inflection of a single person can successfully recognize the vast majority of words spoken by that person.

In operation, speech recognition systems can model and classify acoustic signals to form acoustic models, which are representations of basic linguistic units referred to as phonemes. Upon receipt of the acoustic signal, the speech recognition system can analyze the acoustic signal, identify a series of acoustic models within the acoustic signal and derive a list of potential word candidates for the given series of acoustic models. Subsequently, the speech recognition system can contextually analyze the potential word candidates using a language model as a guide.

The task of the language model is to express restrictions imposed on the manner in which words can be combined to form sentences. The language model can express the likelihood of a word appearing immediately adjacent to another word or words. Language models used within speech recognition systems typically are statistical models. Examples of well-known language models suitable for use in speech recognition systems include uniform language models, finite state language models, grammar based language models, and m-gram language models. Statistically, in an m-gram language model, all word sequences are deemed possible. As a result, in an m-gram language model, the probability of a word having been uttered by a speaker can be based only upon the (m−1) immediate predecessor words. Typical m-gram language models can include the unigram (m=1), bigram (m=2) and trigram (m=3) language models.

Trigram language models are formed by constructing all possible three word permutations for each word in a large corpus of text typically referred to as a training corpus. Subsequently, the frequency of each trigram appearing in the training corpus can be observed. Unigrams, bigrams, and trigrams appearing in the training corpus can be assigned the corresponding frequency values, appropriately discounted to leave some probability space for unseen bigrams and trigrams. The resulting collection of unigrams, bigrams and trigrams and their corresponding frequency values (language model statistics) form the trigram language model.

After a speech recognition vocabulary with its associated language model statistics has been created, there will arise a need to add new words. A language model developer might need to add new words when refining the speech recognition vocabulary or when building an extension to the vocabulary. An end-user of a speech recognition system might need to add his or her own personal words to the vocabulary. Hence, the needed language model statistics must be generated for each additional new word prior to adding the additional words to the speech recognition system vocabulary. However, in order to add a new word lacking language model statistics to a speech recognition system, a new training corpus containing therein the additional words must be analyzed to develop unigrams, bigrams, trigrams, and frequency data for the additional words.

Alternatively, a language model developer might edit a speech-dictated document to include the additional words by manually inserting each additional new word in a context-relevant location of the speech-dictated document. Although this alternative approach can produce adequate results when editing a small file or a small number of files, the process can become cumbersome when developing specialized speech recognition vocabularies for specialized topics such as medicine, law and travel. Such specialized topics implicate the modification of thousands of files. Moreover, typically those files exceed in size the maximum capacity of a conventional text editor.

It is sometimes possible to obtain language model statistics for a new word from contextually-related words or classes of words in the existing speech recognition vocabulary. For example, if the word "Midway", a reference the airport located in Chicago, Ill., is to be added to the speech recognition vocabulary, language model statistics must be developed for this additional new word. However, rather than developing completely new statistical information for the additional word, the language model statistics for "Midway" can be based upon existing language model statistics for the existing word "Heathrow" in reference to the airport located in London, England.

Present methods of adding new words to a speech recognition system by an end-user include (1) correction in a speech-dictated document or (2) analysis of user-supplied sample documents. The language model statistics generated in these two methods are limited. Adding a new word during correction will only yield one sample context for the new word. The contextual coverage attained by adding new words from sample documents depends on the amount of text present in the user-supplied documents. The number of documents typically supplied for analysis tends to be small and, therefore, leads to very few sample contexts for the new words. Finally, users might well want to simply add new words to the vocabulary in isolation without any accompanying context, especially if that user is a specialist in a field for which there are no specific language models (or topics) to purchase to extend the vocabulary.

Present methods of adding additional words to speech recognition systems based upon existing language model statistics utilize class files. Class files allow a language model developer to generate a file containing words having similar contextual properties. An example of a class file includes a list of airport names. Once created, the class file itself can be referred to in the language model in lieu of each component word contained in the class file. For example, if the class file "airport.cls" contained as constituent components, "O'Hare", "Heathrow", and "Midway", all instances of those specific airport names in the language model can be substituted with a generic reference to the class file "airport.cls". As such, the trigram "Heathrow in England" would be modified to "[airport.cls] in England".

Developers of speech recognition vocabularies, developers of speech vocabulary extensions (e.g., specialized topics) and end-users can benefit from methods that use class files to generate statistics for new words. However, new words cannot be blindly added to classes because this will often lead to contextual inaccuracies. For example, if 'Midway' were added to the airport class, from the perspective of the language model, 'Midway' in combination with 'in Chicago' can remain as likely a word sequence as 'Midway' in combination with 'in England'—an absurdity. Thus, there has arisen a need for a better way to ensure contextual accuracy when adding additional new vocabulary words to a speech recognition system.

SUMMARY OF THE INVENTION

The present invention is a method of generating language model statistics for a new word added to a language model incorporating at least one class file containing contextually related words. The method can include the following steps: First, language model statistics can be computed based on references to at least one incorporated class file. Second, a new word can be substituted for each reference to a selected class file. Additionally, the language model statistics can be re-computed based on the new word having been substituted for the reference. Third, the re-computed language model statistics can be displayed in a user interface and modifications can be accepted to the re-computed language model statistics through the user interface. Fourth, the language model statistics can be further re-computed based on the modifications. In consequence, the language model statistics are re-computed for the new word without introducing contextual inaccuracies in the language model.

Importantly, if no modifications are accepted in the third step, the new word can be added to the selected class file. As such, the new word can inherit existing context-based language model statistics associated with the selected class file. Also, each of steps one through four can be repeated for each class file associated with the new word. Notably, in one aspect of the invention, the displaying step can include combining the computed language model statistics into a single line of source material; and, displaying the single line of source material in the user interface.

In yet another aspect of the invention, the language model statistics can include m-grams. The m-grams can be unigrams, bigrams and trigrams. Additionally, the language model statistics further can include a frequency corresponding to each m-gram. As such, the method can further include associating a relative frequency with each contextually related word in the selected class file. Moreover, the language model statistics can be computed and re-computed according to the user-specified relative frequencies. Finally, the displaying step can include for each contextually related word in the selected class file, combining all re-computed m-grams and associated relative frequencies into a line of source material; and, displaying the line of source of material in a user interface.

In one particular aspect of the present invention, a method of generating language model statistics for a new word based on existing class files and without introducing contextual inaccuracies can include the following steps. First, for each relevant class, m-grams are generated in which the class reference is replaced by the new word. Second, the generated m-grams can be displayed in a user interface. Third, modifications to the m-grams can be accepted. If modifications are made, the user-edited m-grams are added to the language model. If no modifications are made, the new word is added to the class file so the new word inherits the context of all m-grams contextually associated in the language model with the class. Thus, with or without modifications of the generated m-grams, the new word receives a richer context in the language model than it would have received using current methods.

BRIEF DESCRIPTION OF THE DRAWINGS

There are presently shown in the drawings embodiments of which are presently preferred, it being understood, however, that the invention is not so limited to the precise arrangements and instrumentalities shown, wherein:

FIG. 6 is a depiction of an exemplary class file with a user assigned frequency for each member of the class file.

DETAILED DESCRIPTION OF THE INVENTION

The method of the invention, as described in the foregoing specification, obtains language model statistics for a new word from the existing speech vocabulary classes while preserving contextual accuracy. In particular, a class file containing therein contextually related words can be established for extending the language model. Preferably, a relative frequency can be associated with each of the contextually related words. A user is presented the set of trigrams and bigrams containing a reference to the class file in which those references are substituted with the new word. User modifications and deletions to these m-grams are accepted to ensure contextual accuracy. Finally, the language model statistics are updated to include the modified bigrams and trigrams specified by the user. If the new word is found to be contextually identical to the other class words, the new word is added to the class file and the user is given the opportunity to update the relative frequencies of the contextually related words contained in the class file.

Figure 1:
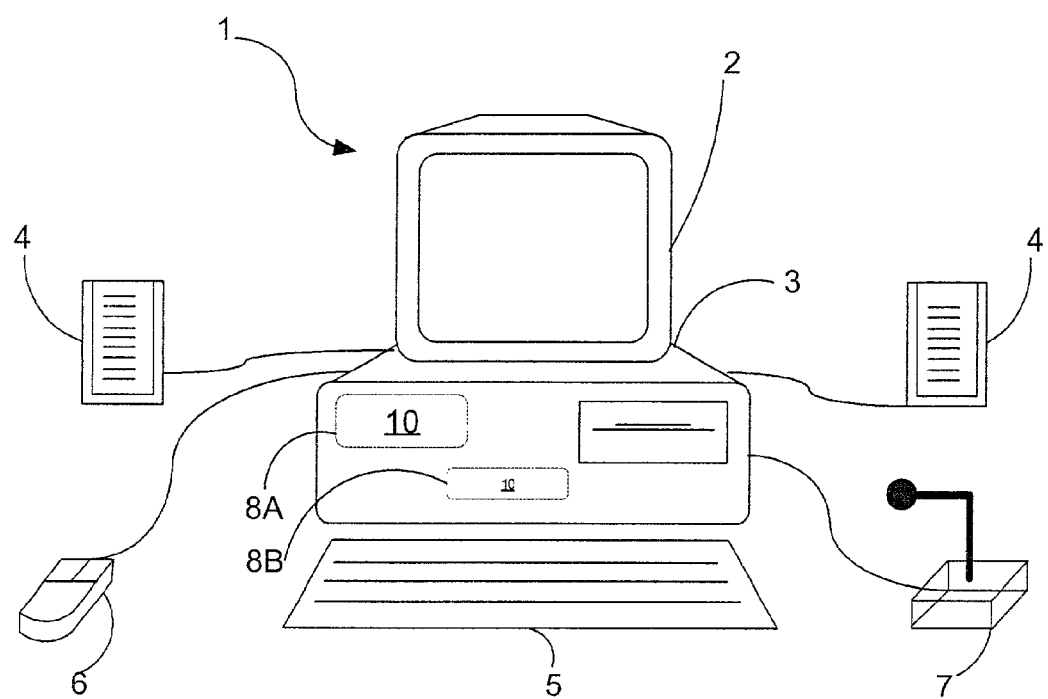
FIG. 1 is a block diagram which illustrates a computer system for speech recognition.

FIG. 1 depicts a typical computer system 1 for use in conjunction with the present invention. The system preferably comprises a computer 3 including a central processing unit (CPU), fixed disk 8A, and internal memory device 8B. The system also includes a microphone 7 operatively connected to the computer system through suitable interface circuitry or "sound board" (not shown), a keyboard 5, and at least one user interface display unit 2 such as a video data terminal (VDT) operatively connected thereto. The CPU can comprise any suitable microprocessor or other electronic processing unit, as is well known to those skilled in the art. An example of such a CPU would include the Pentium or Pentium II brand microprocessor available from Intel Corporation, or any similar microprocessor. Speakers 4, as well as an interface device, such as mouse 6, can also be provided with the system, but are not necessary for operation of the invention as described herein. The various hardware requirements for the computer system as described herein can generally be satisfied by any one of many commercially available high speed multimedia personal computers offered by manufacturers such as International Business Machines Corporation (IBM).

Figure 2:
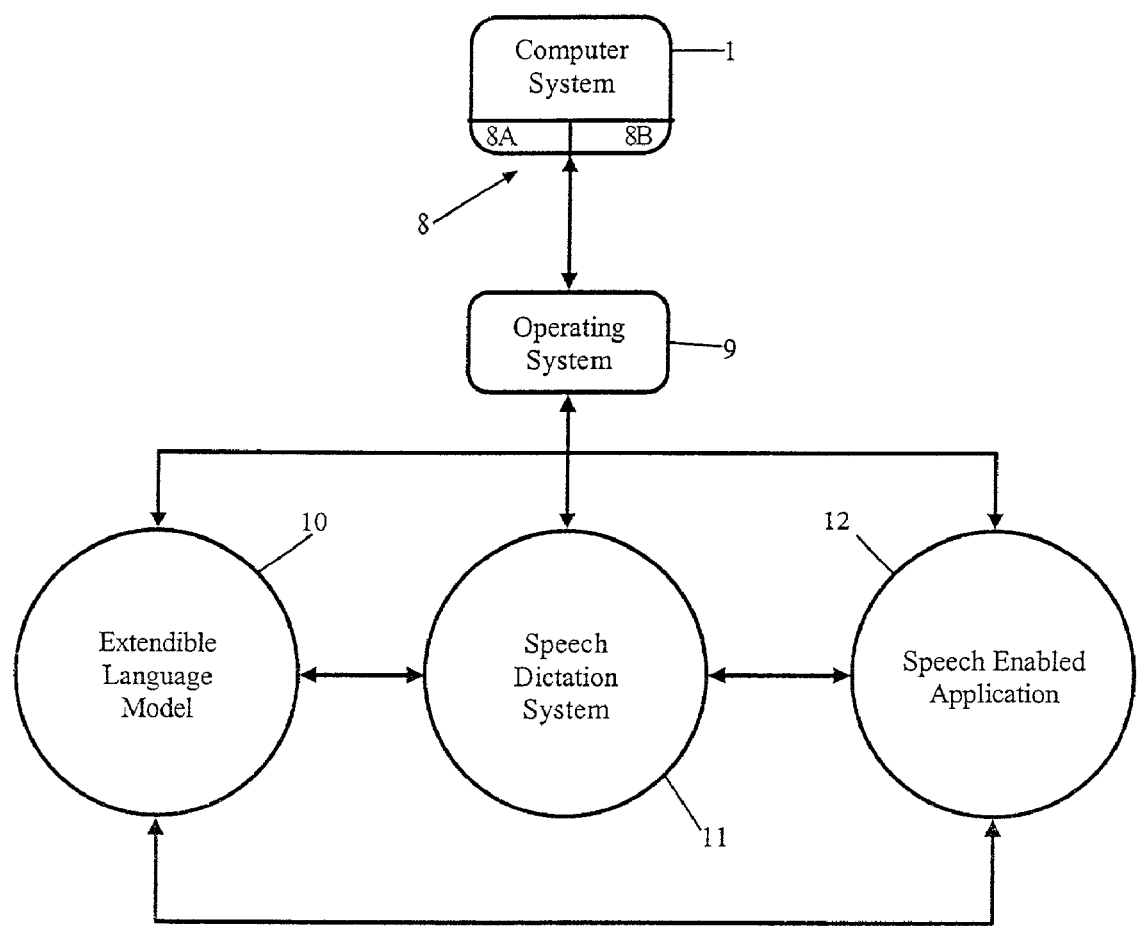
FIG. 2 is a block diagram showing a typical high level architecture for the computer system in FIG. 1.

FIG. 2 illustrates a typical architecture for a speech recognition system in computer system 1. As shown in FIG. 2, the computer system 1 includes a computer memory device 8, which is preferably comprised of an electronic random access memory 8A and a bulk data storage medium 8B, such as a magnetic disk drive. The bulk data storage medium 8B can store therein each of the operating system 9, speech recognition engine 10, speech dictation system 11 and speech enabled application 12. Upon the initialization of the computer system 1, the operating system 9 can be loaded into random access memory 8A. Similarly, upon execution, each of the speech recognition engine 10, speech dictation system 11 and speech enabled application 12 can be loaded into random access memory 8A for execution by the computer system 1.

As shown in FIG. 2, a computer system 1 for use with the method of the invention typically can include an operating system 9, a speech recognition engine 10, a speech dictation system 11 and a speech enabled application 12. However the invention is not limited in this regard and the speech recognition engine 10 can be used with any other application programs which are to be voice enabled. In FIG. 2, the speech recognition engine 10, speech dictation system 11 and speech enabled application 12 are shown as separate application programs. It should be noted however that the invention is not limited in this regard, and these various application programs could be implemented as a single, more complex applications program. For example the speech recognition engine 10 could be combined with the speech dictation system 11 or with any other application to be used in conjunction with the speech recognition engine 10.

In a preferred embodiment which shall be discussed herein, the operating system 9 is one of the Windows family of operating systems, such as Windows2000, Windows NT, Windows 98 which are available from Microsoft Corporation of Redmond, Wash. However, the system is not limited in this regard, and the invention can also be used with any other type of computer operating system. The system as disclosed herein can be implemented by a programmer, using commercially available development tools for the operating systems described above.

In operation, audio signals representative of sound received in microphone 7 are processed within computer system 1 using conventional computer audio circuitry so as to be made available to the operating system 9 in digitized form. The audio signals received by the computer system 1 are conventionally provided to the speech recognition engine 10 via the computer operating system 9 in order to perform speech recognition functions. As in conventional speech recognition systems, the audio signals are processed by the speech recognition engine 10 to identify words spoken by a user into microphone 7.

Figure 3:
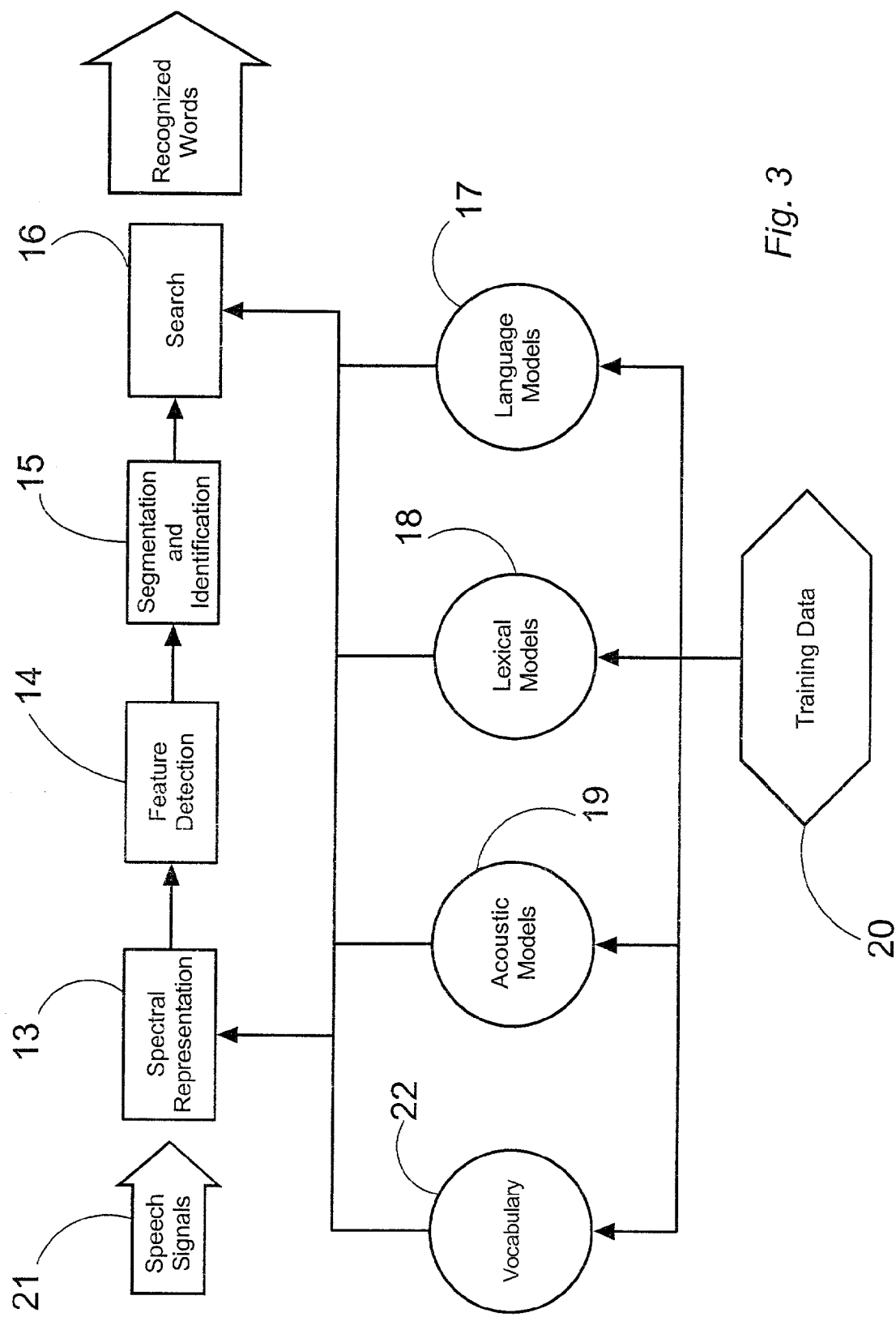
FIG. 3 is a block diagram showing a typical architecture for a speech recognition engine.

FIG. 3 is a block diagram showing typical components which comprise speech recognition engine 10. As shown in FIG. 3, the speech recognition engine 10 receives a digitized, time-varying speech signal 21 from the operating system 9. In spectral representation block 13, a speech analysis system provides a spectral representation of the characteristics of the time-varying speech signal 21 by sampling the signal 21 at some fixed rate, typically every 10–20 msec. In block 14, the feature-detection stage converts the spectral measurements to a set of features that describe the broad acoustic properties of each, differing phonetic unit. This stage emphasizes perceptually important speaker-independent features of the speech signals 21 received from the operating system 9. In block 15, these speech signal features are segmented and identified as phonetic sequences. In this stage, algorithms process the speech signals 21 to further adapt speaker-independent acoustic models to those of the current speaker according to speaker-dependent training data 20. Finally, in search block 16, the speech recognition engine 10 accepts these phonetic sequences and applies search algorithms to guide its search engine to the most likely words corresponding to the speech signal 21.

To assist in the search process, the process in search block 16 can enlist the assistance of acoustic models 19, lexical models 18, language models 17 and vocabulary 22. One skilled in the art will recognize that, while the present invention employs trigrams in its preferred language model, other language model forms, for instance bigrams, can be substituted for the preferred language model. Subsequently, the speech recognizer 11 returns word matches and confidence values for each match which can be used to determine recognition accuracy.

Figure 4:
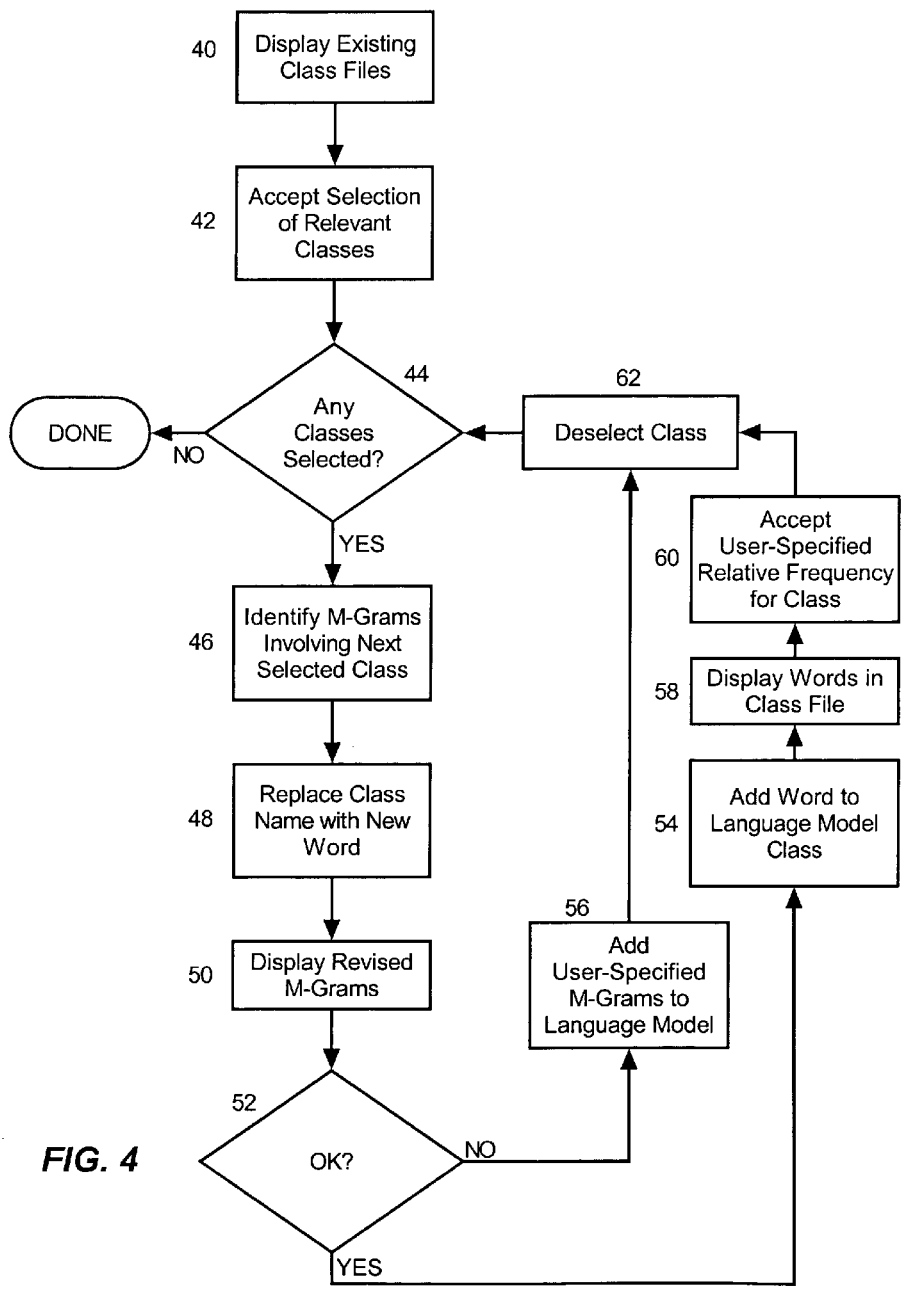
FIG. 4 is a flow chart illustrating a method of generating language model statistics for a new word added to a language model incorporating at least one class file containing contextually related words.
Figure 5A:
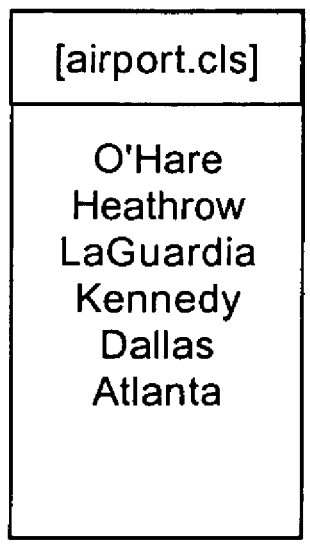
FIG. 5A is a depiction of an exemplary class file.

FIG. 4 is a flow chart illustrating a method of extending a speech recognition language model by incorporating m-grams based on existing classes while preserving contextual accuracy. According to a preferred embodiment, a language model developer can edit a class file stored in memory. An exemplary class file is shown in FIG. 5A. The class file can contain therein words contextually related to each other. Thus, as shown in FIG. 5A, the words contained in the class file, "airport.cls" are contextually related as the names of airports. Notably, the class file can be stored in a binary format, or in a text format. Notwithstanding, rather than editing an existing class file, a user can create a new class file. Still, the format in which a class file is stored, and the technique by which a user can manipulate the class file remains inconsequential to the present invention. The method merely requires that a user can manipulate a class file for grouping together contextually related words.

In step 40, the list of classes in the speech recognition vocabulary appears in a user interface. In step 42, a user input can be accepted which specifies which classes are contextually relevant to the word that is being added. For example, a vocabulary for 'Travel' might contain an airport class, an airlines class, a country class, a city class, and so on. If the user is adding 'Midway' to the vocabulary, he or she would select both the airport and the airline classes as being relevant.

Figure 5B:
FIG. 5B is a depiction of exemplary trigrams containing a reference to a class file.

In step 44, if all classes identified by the user have been processed, the method can branch to termination. Otherwise, in step 46, the next user-identified class and its language model statistics are retrieved from computer memory. For example, for the exemplary class file "airport.cls" containing the names of airports, each unigram, bigram, and trigram containing a reference to the class file "airport.cls" can be retrieved. Exemplary trigrams each containing a reference to the class file "airport.cls" are shown in FIG. 5B.

Figure 5C:
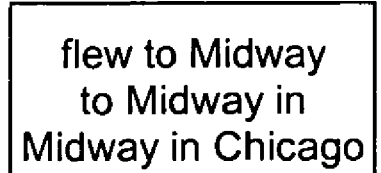
FIG. 5C is a depiction of exemplary trigrams formed from a new word.
Figure 7A:
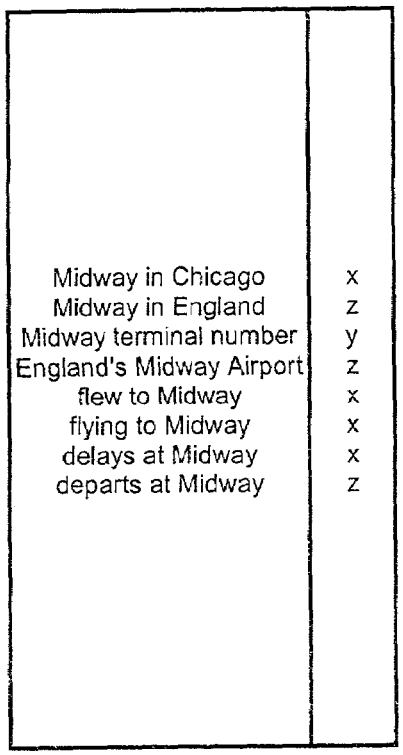
FIG. 7A is a depiction of exemplary trigrams generated by the speech recognition system for presentation to the user.

In step 48, the m-grams identified in step 46 are modified to include the new word in place of the class name. For example, each unigram, bigram and trigram containing a reference to the class file 'airport.cls' is modified so each reference to 'airport.cls' is replaced with the new word that is being added to the vocabulary. Exemplary modified trigrams for the example in FIG. 5B appear in FIG. 5C. In step 50 of FIG. 4, the modified m-grams can be displayed to the user in a user interface in a user readable format. An exemplary user interface is shown in FIG. 7A. Significantly, step 50 allows the user to ensure that the speech recognition system has contextually accurate language model statistics for each new word. Specifically, each bigram and trigram for each new word can be presented to the user for possible modification. Such data can be presented to the user in a variety of ways using many different graphical user interfaces including but not limited to a list or table format. For example, as is the case in FIG. 7A, the user can be presented with a list of all bigrams and trigrams with the selected class replaced by the new word. This manner of presentation requires one view for each bigram and trigram. In this case, such a table can list the bigrams and trigrams in one column and have a second column for user-specified frequencies.

Figure 7B:
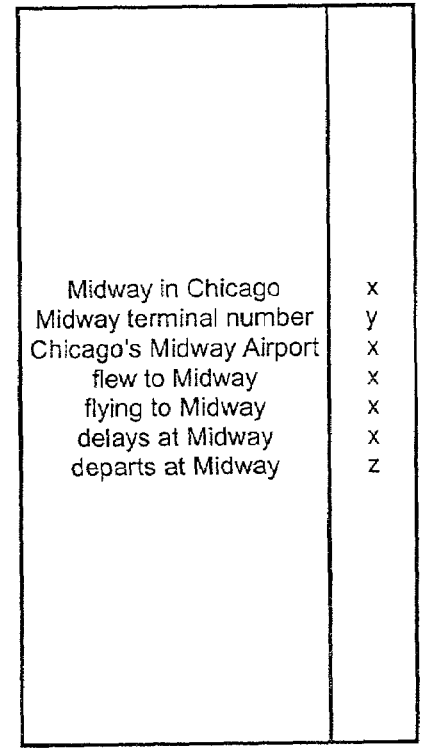
FIG. 7B is a depiction of exemplary trigrams generated by the speech recognition system after user entered modifications to the trigrams are received.
Figure 7C:
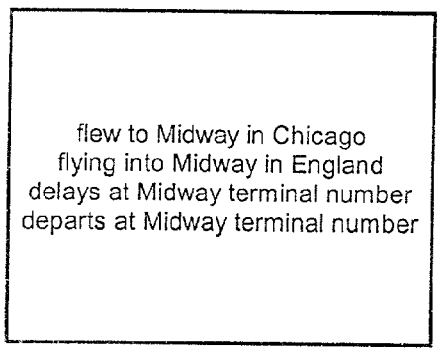
FIG. 7C is a depiction of exemplary source material generated by the speech recognition system for presentation to the user.
Figure 7D:
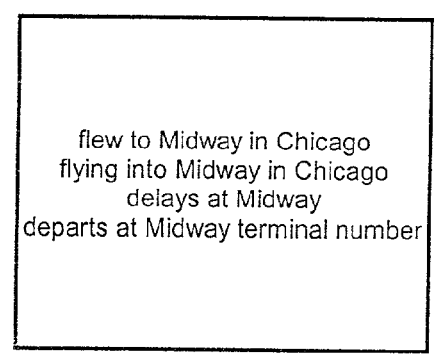
FIG. 7D is a depiction of exemplary source material generated by the speech recognition system after user entered modifications to the source material are received.

In step 52, if modifications to the m-grams are made by the user, the process branches to step 56 in which the edited m-grams and their relative frequencies are used to update the language model. Specifically, the user can edit or delete any of the bigrams, trigrams, or source materials that appear to be incorrect or nonsensical. For example, as shown in FIG. 7B, if the user sees a trigram such as "Midway in England", the user can edit the trigram to 'Midway in Chicago'. Similarly, as shown in FIGS. 7C and 7D, in the case of the user seeing text such as 'flying into Midway in England', the user can edit the material to 'flying into Midway in Chicago'.

By comparison, if no modifications are apparent in step 52, then the new word is contextually identical to the words in the class, which makes it reasonable to add the new word to the class file in step 54. In step 58 of FIG. 4, the contents of the expanded class file can appear in a user interface." Notably, regardless of the format in which the class file has been stored, the contents of the class file are displayed in the user interface in a user readable format. Thus, while a class file stored in ASCII format requires little modification to be displayed, a class file stored as a binary object will require an ASCII translation—a technique well-known in the art. In displaying the class file in a user interface, the manner in which the class file is displayed can vary and can include a variety of suitable formats and graphical components. Examples of suitable formats and components can include but are not limited to a list or a table. Hence, returning to the example of the class file "airport.cls", a table containing the names of the airports contained in the "airport.cls" class file can be utilized. In this case, such a table can list the airport names in one column, and have a second column for user specified frequencies for each airport name.

In step 60 a user input can be accepted which specifies a frequency value for each word in the class file. The frequency value can be a relative frequency value with regard to the other words in the class file. For example, if the "airport.cls" class file contains the words "O'Hare", "LaGuardia", "Kennedy", "Dallas", and "Atlanta", then the user can specify frequency values such as "high", "medium", or "low". Consequently, a word associated with a frequency value of "high" has a higher frequency value in relation to another word with a frequency value of either "medium" or "low". Similarly, a word associated with a frequency of "medium" has a higher frequency than a word associated with the frequency of "low". Alternatively, a numbering system with 1 representing the lowest relative frequency and 10 representing the highest relative frequency can be used. FIG. 6 illustrates an exemplary "airport.cls" class file containing therein words having corresponding associated relative frequency values. It should be appreciated that a variety of systems can be used to associate a relative frequency with each word in a class and the invention is not limited in this regard.

Also, the user specified relative frequency of each word in the class file can be translated into an actual frequency value that can be used by the speech recognition system. For example, a relative frequency value of "high" can be translated into an actual frequency number. It should be appreciated that the translation can be performed through any suitable means including various algorithms or through the use of a reference table. Following step 60 or step 56, in step 62 the class is deselected to show that it has been processed. The process returns to step 44 where the user determines whether there are any more classes that he or she needs to process for the new word.

FIG. 7C depicts an alternative method for displaying the calculated language model statistics in a user interface. Specifically, as an alternative, the bigrams and trigrams can be combined to create a line of source material for display to the user. For example, the three trigrams "flew to Midway", "to Midway in", and "Midway in Chicago" can be combined into one line of source material which reads "flew to Midway in Chicago". In this case, three trigrams requiring three views can be combined to form a single line of text requiring a single view (as long as the trigrams share pairs of words as required to create the five-word phrase).

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

We claim:

1. A method of generating language model statistics for a new word added to a language model incorporating at least one class file containing contextually related words, the steps of the method comprising:
   (a) selecting and incorporating within the language model at least one class file, the at least one class file defining an incorporated class file;
   (b) computing language model statistics based on references, each reference associated with at least one incorporated class file;
   (c) selecting at least one incorporated class file and within said selected at least one incorporated class file substituting a new word for each reference, said reference being associated with the selected incorporated class file, and re-computing said language model statistics based on said new word having been substituted for said reference;

(d) displaying said re-computed language model statistics in a user interface and accepting modifications to said re-computed language model statistics through said user interface; and, (e) further re-computing said language model statistics based on said modifications, whereby said language model statistics are re-computed for said new word without introducing contextual inaccuracies in the language model.

2. The method of claim 1, further comprising:

(f) if no modifications are accepted in step (d), adding said new word to said selected one of said at least one incorporated class file, said new word inheriting existing context-based language model statistics associated with said selected one of said 3. The method of claim 2, further comprising associating a relative frequency with each contextually related word in said selected one of said at least one incorporated class file.

4. The method according to claim 3, wherein said language model statistics are computed and re-computed according to said user-specified relative frequencies.

5. The method according to claim 3, wherein said displaying step comprises:

for each contextually related word in said selected one of said at least one incorporated class file, combining all re-computed m-grams and associated relative frequencies into a line of source material; and, displaying said line of source of material in a user interface.

6. The method of claim 1, wherein said reference comprises a plurality of references, said method further comprising repeating steps (a)–(e) for each incorporated class file associated with at least one of said plurality of references.

7. The method of claim 1, wherein said displaying step comprises:

combining said computed language model statistics into a single line of source material; and, displaying said single line of source material in said user interface.

8. The method of claim 1, wherein said language model statistics comprise m-grams.

9. The method of claim 8, wherein said language model statistics further comprise a frequency corresponding to each of said m-grams.

10. The method of claim 8, wherein said m-grams are selected from the group consisting of unigrams, bigrams and trigrams.

11. A machine readable storage, having stored thereon a computer program generating language model statistics for a new word added to a language model incorporating at least one class file containing contextually related words, said computer program having a plurality of code sections executable by a machine for causing the machine to perform the steps of:

(a) selecting and incorporating within the language model at least one class file, the at least one class file defining an incorporated class file;

(b) computing language model statistics based on references, each reference associated with at least one incorporated class file;

(c) selecting at least one incorporated class file and within said, selected at least one incorporated class file substituting a new word for each reference, said reference being associated with the selected incorporated class file, and re-computing said language model statistics based on said new word having been substituted for said reference;

(d) displaying said re-computed language model statistics in a user interface and accepting modifications to said re-computed language model statistics through said user interface; and, (e) further re-computing said language model statistics based on said modifications, whereby said language model statistics are re-computed for said new word without introducing contextual inaccuracies in the language model.

12. The machine readable storage of claim 11, further comprising:

(f) if no modifications are accepted in step (d), adding said new word to said selected one of said at least one incorporated class file, said new word inheriting existing context-based language model statistics associated with said selected one of said at least one incorporated class file.

13. The machine readable storage of claim 12, further comprising associating a relative frequency with each contextually related word in said selected one of said at least one incorporated class file.

14. The machine readable storage of claim 13, wherein said language model statistics are computed and re-computed according to said user-specified relative frequencies.

15. The machine readable storage of claim 13, wherein said displaying step comprises:

for each contextually related word in said selected one of said at least one incorporated class file, combining all re-computed m-grams and associated relative frequencies into a line of source material; and, displaying said line of source of material in a user interface.

16. The machine readable storage of claim 11, wherein said reference comprises a plurality of references, said machine readable storage further including code sections causing the machine to repeat steps (a)–(e) for each incorporated class file associated with at least one of said plurality of references.

17. The machine readable storage of claim 11, wherein said displaying step comprises:

combining said computed language model statistics into a single line of source material; and, displaying said single line of source material in said user interface.

18. The machine readable storage of claim 11, wherein said language model statistics comprise m-grams.

19. The machine readable storage of claim 18, wherein said language model statistics further comprise a frequency corresponding to each of said m-grams.

20. The machine readable storage of claim 18, wherein said m-grams are selected from the group consisting of unigrams, bigrams and trigrams.

* * * * *